United States Patent
He et al.

(10) Patent No.: US 7,866,557 B2
(45) Date of Patent: Jan. 11, 2011

(54) IMAGING-BASED BAR CODE READER UTILIZING MODIFIED ROLLING SHUTTER OPERATION

(75) Inventors: Duanfeng He, South Setauket, NY (US); Bradley S. Carlson, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 618 days.

(21) Appl. No.: 11/862,583

(22) Filed: Sep. 27, 2007

(65) Prior Publication Data

US 2009/0084847 A1 Apr. 2, 2009

(51) Int. Cl.
G03B 7/08 (2006.01)
G06K 5/00 (2006.01)
G06K 7/10 (2006.01)
G06K 7/14 (2006.01)
H04N 3/14 (2006.01)
H04N 5/335 (2006.01)

(52) U.S. Cl. ............... 235/462.24; 235/462.41; 235/454; 348/296; 348/297; 348/298

(58) Field of Classification Search ............ 235/462.06, 235/462.11, 462.25, 462.35, 462.41, 462.24, 235/454; 340/296–298
See application file for complete search history.

(56) References Cited

U.S. PATENT DOCUMENTS

| | | | | |
|---|---|---|---|---|
| 7,543,752 B2 * | 6/2009 | Kotlarsky et al. | ...... | 235/462.24 |
| 7,568,628 B2 * | 8/2009 | Wang et al. | ............ | 235/462.45 |
| 7,611,060 B2 * | 11/2009 | Wang et al. | ............ | 235/462.23 |
| 7,675,569 B2 * | 3/2010 | Maeda | ........................ | 348/371 |
| 7,699,227 B2 * | 4/2010 | Wang et al. | ................. | 235/454 |
| 7,777,796 B2 * | 8/2010 | Inoue et al. | ................. | 348/296 |
| 7,815,120 B2 * | 10/2010 | Carlson | ................. | 235/462.41 |
| 2005/0206762 A1 * | 9/2005 | Funakoshi | ................. | 348/296 |
| 2005/0253940 A1 * | 11/2005 | Chiba et al. | ................. | 348/247 |
| 2006/0118632 A1 | 6/2006 | Joseph et al. | | |
| 2006/0202036 A1 * | 9/2006 | Wang et al. | ............ | 235/462.07 |
| 2006/0202038 A1 * | 9/2006 | Wang et al. | ............ | 235/462.24 |
| 2006/0274171 A1 * | 12/2006 | Wang | ........................ | 348/294 |
| 2007/0095916 A1 * | 5/2007 | Joseph et al. | ................ | 235/454 |
| 2007/0181689 A1 * | 8/2007 | Kotlarsky et al. | ...... | 235/462.11 |
| 2007/0187509 A1 * | 8/2007 | Kotlarsky et al. | ........ | 235/462.1 |
| 2007/0228174 A1 | 10/2007 | Vinogradov et al. | | |
| 2007/0241195 A1 * | 10/2007 | Hussey et al. | .......... | 235/462.21 |

(Continued)

OTHER PUBLICATIONS

Jacques Leconte, "Areascan Cameras: How to Choose Between Global and Rolling Shutter", Atmel Applications Journal, Winter 2006, Issue No. 6, pp. 37-39, Atmel Corporation, San Jose, CA.

*Primary Examiner*—Daniel Walsh (57) ABSTRACT

An imaging system for use in an bar code reader for imaging a target bar code. The imaging system includes a 2D sensor array generating a series of image frames and The sensor array can be selectively operated in a rolling shutter mode of operation or a pseudo global shutter mode of operation. The imaging system further includes an imaging lens assembly to focus light from the field of view onto the sensor array and an image analysis system for analyzing the series of image frames generated by the sensor array for image brightness and, based on image brightness, operating the sensor array in a selected one of the rolling shutter mode of operation and the pseudo-global shutter mode of operation.

20 Claims, 7 Drawing Sheets

U.S. PATENT DOCUMENTS

| | | | |
|---|---|---|---|
| 2008/0002043 A1* | 1/2008 | Inoue et al. | 348/296 |
| 2008/0024655 A1* | 1/2008 | Maeda | 348/371 |
| 2008/0121715 A1* | 5/2008 | Field | 235/462.25 |
| 2008/0144964 A1* | 6/2008 | Soinio et al. | 382/275 |
| 2008/0179402 A1* | 7/2008 | Barkan et al. | 235/462.41 |
| 2008/0239108 A1* | 10/2008 | Kume | 348/241 |
| 2008/0239126 A1* | 10/2008 | Wakamori | 348/308 |
| 2009/0021612 A1* | 1/2009 | Hamilton et al. | 348/249 |
| 2009/0167911 A1* | 7/2009 | Takane | 348/296 |
| 2009/0303362 A1* | 12/2009 | Ebihara | 348/296 |
| 2010/0044440 A1* | 2/2010 | Wang et al. | 235/462.24 |
| 2010/0090007 A1* | 4/2010 | Wang et al. | 235/462.11 |
| 2010/0232778 A1* | 9/2010 | Gwak et al. | 396/157 |

* cited by examiner

Fig. 9 though, written, the combined exposure period of the pixel rows. This active illumination...

IMAGING-BASED BAR CODE READER UTILIZING MODIFIED ROLLING SHUTTER OPERATION

FIELD OF THE INVENTION

The present invention relates to an imaging-based bar code reader and, more particularly, to an imaging-based bar code reader having a camera assembly utilizing a selected one of a rolling shutter mode of operation and a pseudo global shutter mode of operation depending on ambient lighting conditions.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code, such as a PDF417 and DataMatrix bar codes.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include sensor arrays such as charge coupled device (CCD) arrays, complementary metal oxide semiconductor (CMOS) arrays, or other imaging pixel arrays having a plurality of photosensitive elements (photosensors or pixels). An illumination apparatus or system comprising light emitting diodes (LEDs) or other light source directs illumination toward a target object, e.g., a target bar code. Light reflected from the target bar code is focused through a system of one or more lens of the imaging system onto the sensor array. Thus, the target bar code within a field of view (FV) of the imaging lens system is focused on the sensor array. Typically, for imaging 2D bar codes, two dimensional (2D) sensor arrays are utilized wherein a light receiving surface of the sensor array comprise multiple rows of light receiving photosensitive pixels.

Bar code readers typically utilize electronic shutters to determine exposure time of the pixels of the sensor array. An electronic shutter means that no physical shutters are activated, rather exposure durations for pixel rows of the sensor array are all controlled by electronically activating and deactivating the pixels of the sensor array. Two types of electronic shutter modes of operation are typically employed with two dimensional (2D) sensor arrays: rolling shutter and global shutter. In a traditional rolling shutter mode of operation, all rows of pixels in the sensor array are exposed at different times. This is shown schematically in prior art FIG. 6 where pixel rows R1, R2, R3, . . . , Rn are exposed for respective exposure times E1, E2, E3, . . . , En. As can be seen, the row exposure times E1, E2, . . . , En are sequential, that is, the exposure times of adjacent rows, e.g., E1 and E2 for rows R1 and R2, are staggered. While the exposure times of adjacent rows may overlap, the commencement of the exposure time for each row is offset and sequentially later than the commencement of the exposure time for the preceding row. Readout of a row commences after completion of the exposure time for the row. This is shown as O1 for readout of row R1, O2 for readout of row R2, etc., in FIG. 6.

In traditional rolling shutter, if active illumination or flash is used (emitted by an illumination system of the reader), the flash must be long enough in duration to cover the combined exposure period of all the pixel rows. This active illumination or pulse/flash is shown as $F_D$ in FIG. 6. The rolling shutter mode of operation is easy and inexpensive to implement required only three transistors at the pixel level. Additionally, rolling shutter has been found to provide good signal-to-noise ratio and is more tolerant of imaging lens systems utilizing wide aperture lenses.

In a global shutter mode of operation, all pixel rows have a common, simultaneous exposure time. This is shown schematically in prior art FIG. 7 where pixel rows R1, R2, R3, . . . , Rn are exposed for respective exposure times E1, E2, E3, . . . , En. As can be seen, the row exposure times E1, E2, . . . , En overlap or are congruent, that is, the exposure times for each row occur at the same time. At the end of exposure time, pixel content is stored in a respective memory beside each pixel, or in a dedicated frame storage area, and then readout commences on a row by row basis. This readout is schematically shown as O1, O2, O3, . . . , On in FIG. 7. In a global shutter mode of operation, because all pixel rows have a common, simultaneous exposure time, a short duration pulse or flash (shown as $F_D$) may be used to illuminate the target bar code.

Because global shutter requires a memory for each pixel of the sensor array, additional electronics in the form of at least one additional transistor for each pixel are required for a sensor array configured to operate in global shutter mode as compared to rolling shutter mode. Additionally, the global shutter memory must be non-sensitive meaning no light leakage is permitted. Thus, while global shutter has certain advantages over the rolling shutter mode of operation in terms of short flash duration, global shutter is more costly and difficult to implement. Moreover, in many sensor arrays, global shutter is not supported.

A discussion and comparison of global and rolling shutter readout structures may be found in an article entitled "Areascan Cameras: How to Choose Between Global and Rolling Shutter" by Jacques Leconte, Camera & Application Development Manager, Atmel, appearing in *Atmel Applications Journal*, Issue 6, Winter 2006, pages 37-39, Atmel Corporation, San Jose, Calif. 95131 (www.atmel.com). The aforesaid Atmel Applications Journal article is incorporated herein in its entirety by reference.

What is needed is a bar code reader having an imaging system utilizing a sensor array that is configured to operating in a rolling shutter mode of electronic shutter operation that can select, depending on ambient lighting conditions, between utilizing: a) a rolling shutter mode of operation taking advantage of good signal-to-noise ratio inherent in rolling shutter operation and b) a pseudo-global shutter method of operation that has the advantage of providing a short flash duration.

SUMMARY

In one aspect, the present invention features an imaging system for use in an imaging-based bar code reader to image a target bar code. The imaging system includes a 2D sensor array generating a series of image frames and that can be selectively operated in a rolling shutter mode of operation or a pseudo-global shutter mode of operation depending on ambient lighting conditions.

In one exemplary embodiment, the imaging system includes:

an illumination system, when actuated, emitting a pulse of illumination;

a 2D sensor array configured in a rolling shutter mode of electronic shutter operation and generating a series of image frames of a field of view of the imaging system, the sensor array selectively operable in a rolling shutter mode of operation wherein commencement of image frame exposure times are staggered for adjacent rows of the sensor array and operable in a pseudo-global shutter mode of operation wherein image frame exposure times for adjacent rows of the sensor array are overlapping such that there is a common exposure time wherein substantially all of the rows of the sensor array are simultaneously exposed and further wherein, for at least a portion of the common exposure time, the illumination system is actuated to emit an illumination pulse;

an imaging lens assembly to focus light from the field of view onto the sensor array; and an image analysis system for analyzing the series of image frames generated by the sensor array for image brightness and, based on image brightness, operating the sensor array in a selected one of the rolling shutter mode of operation and the pseudo-global shutter mode of operation.

In one exemplary embodiment, the sensor array is normally operated in the pseudo-global shutter mode of operation and is switched to the rolling shutter mode of operation if image brightness exceeds a level of brightness such that an image of the target bar code in the series of image frames would be undecodable.

In one exemplary embodiment, the imaging lens assembly includes a narrow band optical filter to block light outside of a predetermined range from passing through the lens assembly.

In one exemplary embodiment, the imaging system further includes an illumination system emitting illumination of a predetermined wavelength, the predetermined wavelength being within the predetermined range of the narrow band optical filter.

In one exemplary embodiment, the image frame exposure times for sensor array rows for the pseudo-global shutter mode of operation are greater in duration than image frame exposure times for corresponding sensor array rows for rolling shutter mode of operation.

In one exemplary embodiment, the 2D sensor array and the imaging lens assembly are part of a camera assembly.

In one aspect, the present invention features an imaging-based bar code reader for imaging a target bar code. The bar code reader includes an imaging system having a 2D sensor array generating a series of image frames and that can be selectively operated in a rolling shutter mode of operation or a pseudo global shutter mode of operation depending on ambient lighting conditions. In one exemplary embodiment, the bar code reader includes:

an camera assembly including:

an illumination system, when actuated, emitting a pulse of illumination;

a 2D sensor array configured in a rolling shutter mode of electronic shutter operation and generating a series of image frames of a field of view of the imaging system, the sensor array selectively operable in a rolling shutter mode of operation wherein commencement of image frame exposure times are staggered for adjacent rows of the sensor array and operable in a pseudo-global shutter mode of operation wherein image frame exposure times for adjacent rows of the sensor array are overlapping such that there is a common exposure time wherein substantially all of the rows of the sensor array are simultaneously exposed and further wherein, for at least a portion of the common exposure time, the illumination system is actuated to emit an illumination pulse;

an imaging lens assembly to focus light from the field of view onto the sensor array; and an image analysis system for analyzing the series of image frames generated by the sensor array for image brightness and, based on image brightness, operating the sensor array in a selected one of the rolling shutter mode of operation and the pseudo-global shutter mode of operation.

In one exemplary embodiment, the sensor array is normally operated in the pseudo-global shutter mode of operation and is switched to the rolling shutter mode of operation if image brightness exceeds a level of brightness such that an image of the target bar code in the series of image frames would be undecodable.

In one exemplary embodiment, the imaging lens assembly includes a narrow band optical filter to block light outside of a predetermined range from passing through the lens assembly.

In one exemplary embodiment, the imaging system further includes an illumination system emitting illumination of a predetermined wavelength, the predetermined wavelength being within the predetermined range of the narrow band optical filter.

In one exemplary embodiment, wherein the image frame exposure times for sensor array rows for the pseudo-global shutter mode of operation are greater in duration than image frame exposure times for corresponding sensor array rows for rolling shutter mode of operation.

In one exemplary embodiment, the 2D sensor array and the imaging lens assembly are part of a modular camera assembly.

These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION

An exemplary embodiment of an imaging-based bar code reader of the present invention is shown schematically at 10 in FIGS. 1-5. The bar code reader 10, in addition to imaging and decoding both 1D and 2D bar codes and postal codes, is also capable of capturing images and signatures. The bar code reader 10 includes an imaging system 20 and a decoding system 40 for capturing image frames of a field of view FV of the imaging system 20 and decoding encoded indicia within a captured image frame. The bar code reader 10 includes a housing 11 supporting the imaging and decoding systems 20, 40 within an interior region 11a of the housing 11.

The imaging and decoding systems 20, 40 operate are part of reader circuitry 12 that includes a microprocessor 13. The imaging system 20 comprises and an imaging camera assembly 22 and associated imaging circuitry 24. The imaging camera 22 includes a housing 25 supporting an imaging lens assembly 26 and an imager 27 comprising a sensor array 28, such as a CCD sensor array. Advantageously, the sensor array 28 is configured with a rolling shutter electronic shutter.

The imager 27 is enabled to capture an image of the field of view FV of the imaging camera assembly 22. Each row R1, R2, R2, . . . , Rn of the sensor array 28 is comprised of a group of photosensitive pixels which are enabled during an exposure period for the row and, during the exposure period, accumulate charge on individual pixels in proportion to the intensity or brightness of the light incident on each of the individual pixels in the group of pixels.

Advantageously, the imaging camera 22 is modular, that is, enclosed within the camera housing 25 and capable of being installed in the reader housing 11 as a single unit. In one preferred embodiment of the present invention, the bar code reader 10 is a hand held portable reader encased in the pistol-shaped housing 11 adapted to be carried and used by a user walking or riding through a store, warehouse or plant for reading bar codes for stocking and inventory control purposes. However, it should be recognized that the present invention is equally useful in other types of bar code readers or scanners, such as a hand-held computer containing a bar code reader or a bar code reader that can used in a hand-held mode or inserted in a docking station for use in a fixed-position mode.

Figure 1:
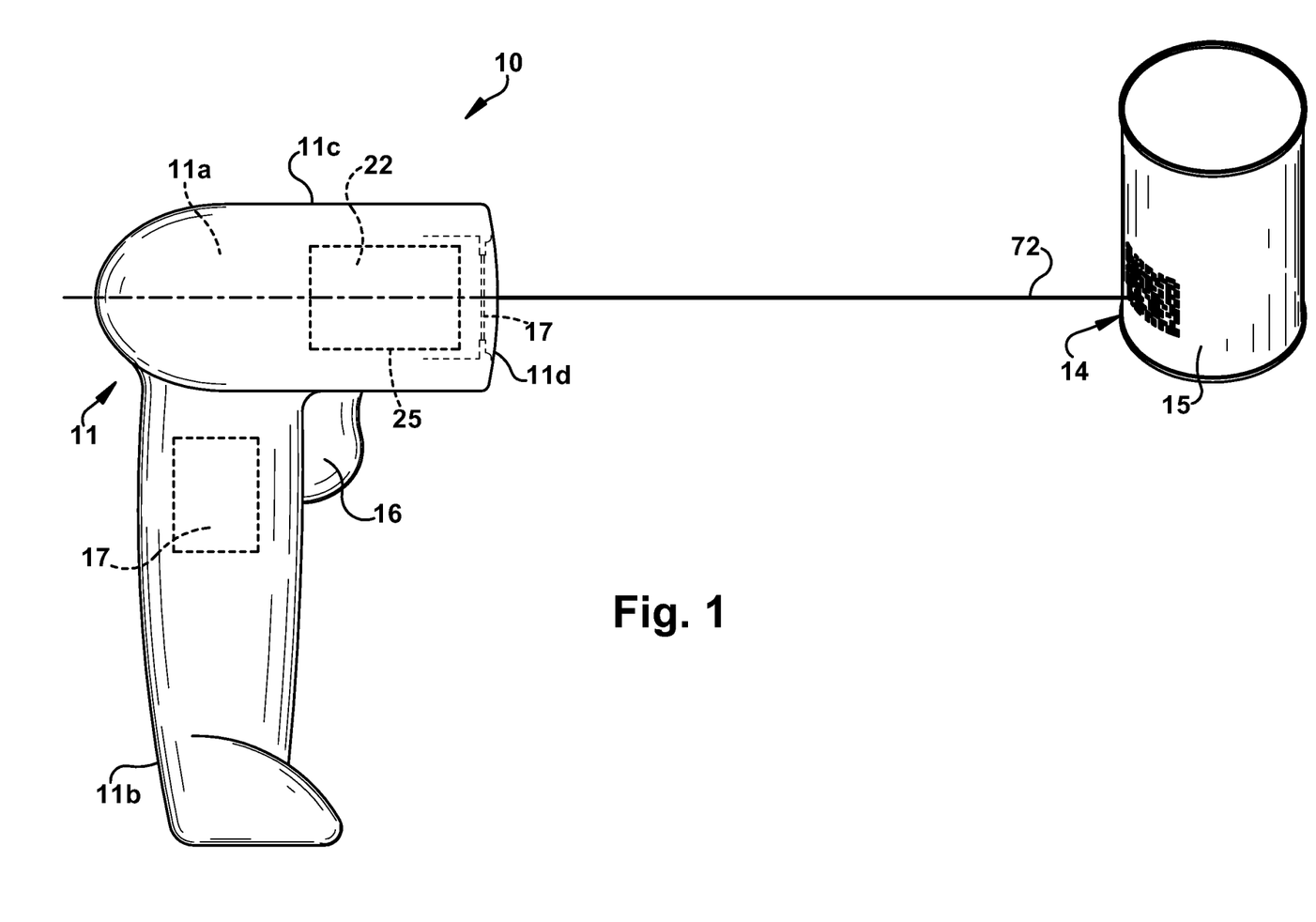
FIG. 1 is a schematic side elevation view of an imaging-based bar code reader of the present invention.
Figure 2:
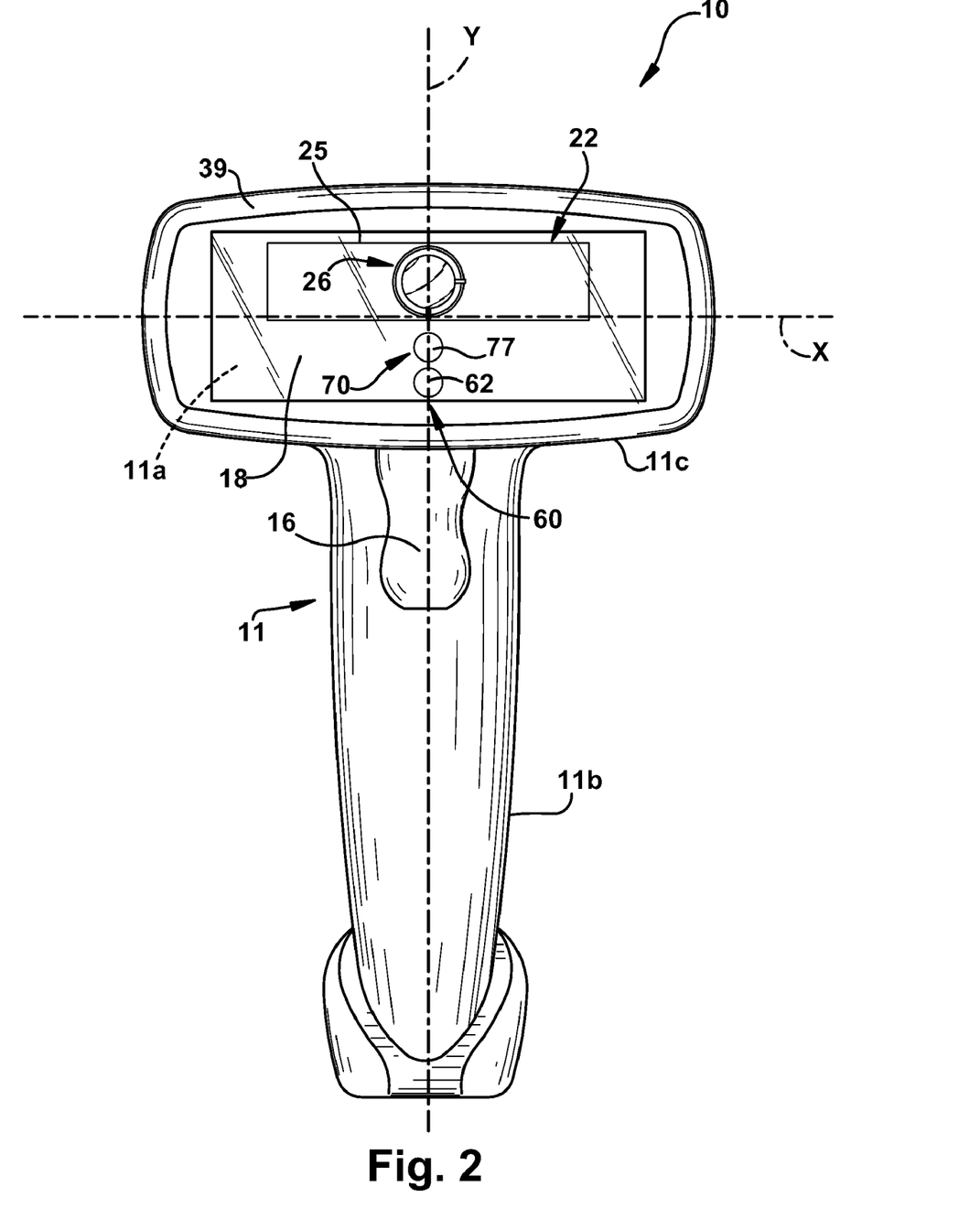
FIG. 2 is a schematic front elevation view of the imaging-based bar code reader of FIG. 1.
Figure 3:
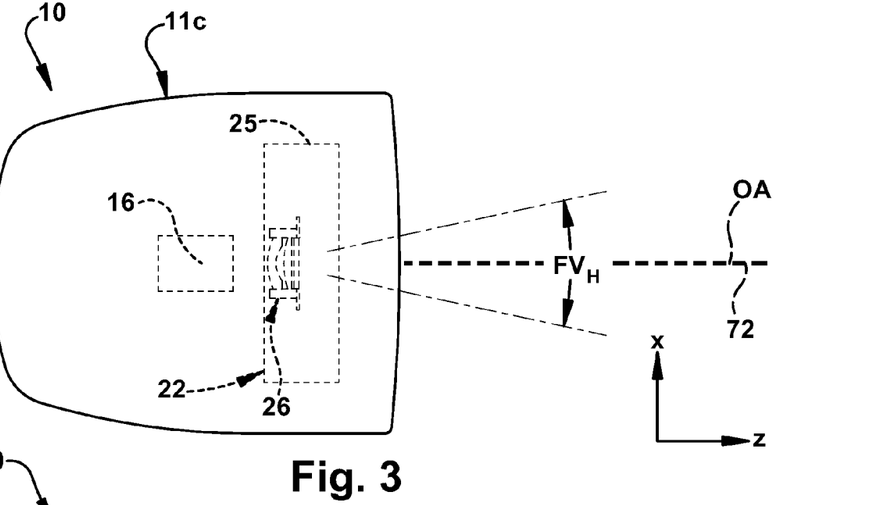
FIG. 3 is a schematic top view of the imaging-based bar code reader of FIG. 1.

As is best seen in FIGS. 1 and 2, the bar code reader housing 11 includes a generally upright gripping portion 11b adapted to be grasped by a user's hand and a horizontally extending scanning head 11c which supports the imaging assembly 20, an illumination assembly 60 and an aiming apparatus 70. At the intersection of gripping portion 11b and the scanning head 11c is a trigger 16 coupled to bar code reader circuitry 12 for initiating reading of target indicia, such as the target bar code 14, when the trigger 16 is pulled or pressed. The bar code reader circuitry 12, the imaging system 20 and the decoding circuitry 40 are coupled to a power supply 17, which may be in the form of an on-board battery or a connected off-board power supply. If powered by an off-board power supply, the scanner 10 may be a stand-alone unit or have some or all of the scanner's functionality provided by a connected host device.

When actuated to read the target bar code 14, the imaging system 20 images a field of view FV (shown schematically in FIG. 5) of the imaging system 20 and generates a series of image frames 42 which are stored in a memory 44. The field of view FV of the imaging system 20 is determined by the optical characteristics of the imaging lens assembly 26 and the size and light receiving active area of the sensor array 28. The field of view FV includes a horizontal field of view FVH (shown schematically in FIG. 3) and a vertical field of view FVV (shown schematically in FIG. 4).

If the target bar code 14 is within the field of view the target bar code 14 during a reading session where the imaging system 20 is activated, each of the image frames of the series of captured image frames 42 will include a full or partial image 14' (shown schematically in FIG. 5) of the target bar code 14. Utilizing one or more of the captured image frames 42, the decoding system 40 operates to decode the digitized image 14' of the target bar code 14.

The imaging and decoding circuitry 24, 40 may be embodied in hardware, software, firmware, electrical circuitry or any combination thereof. The imaging circuitry 24 may be disposed within, partially within, or external to the camera assembly housing 25. Shown schematically in FIG. 4, the imaging camera housing 25 is supported with the scanning head 11c of the housing 11 and receives illumination from the field of view FV including reflected illumination from the target bar code 14, through a transparent window 18 (FIGS. 2 & 4) supported by the scanning head 11c.

Imaging and Decoding

The imaging system 20 includes the imager 27 of the imaging camera assembly 22. The imager 27 comprises a charged coupled device (CCD), a complementary metal oxide semiconductor (CMOS), or other imaging pixel array, operating under the control of the imaging circuitry 24. In one exemplary embodiment, the sensor array 28 of the CCD imager 27 comprises a two dimensional (2D) mega pixel array with a typical size of the pixel array being on the order of 1280×1024 pixels. The pixel array 28 is secured to the printed circuit board 25b (FIG. 4), in parallel direction for stability. The 2D sensor array 28 is adapted to provide high resolution imaging of 2D target bar codes having high density bar code features, for example, successfully imaging (to permit decoding) of bar code features on the order of 4-5 mils over an extended range.

Figure 4:
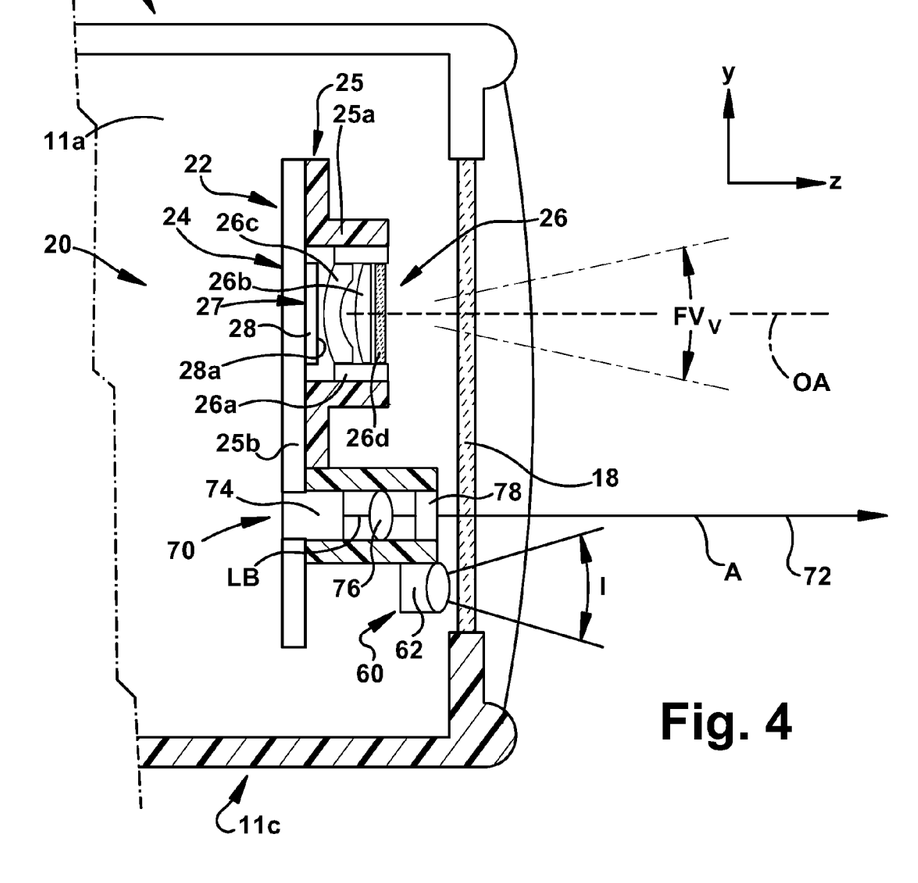
FIG. 4 schematic sectional view of a portion of the imaging-based bar code reader of FIG. 1 showing the scanner head.

As is best seen in FIG. 4, the imaging lens assembly 26 focuses light reflected from the target bar code 14 through one or more apertures and/or lenses 26a, 26b onto the sensor array 28. Thus, the imaging lens assembly 26 focuses an image of the target bar code 14 (assuming it is within the field of view FV) onto the array of pixels comprising the sensor array 28. The imaging lens assembly 26 also includes a narrow-band optical filter 26d to block undesired wavelengths of ambient light that otherwise would be focused on a light receiving surface 28a of the sensor array 28. The lenses 26a, 26b and the optical filter 26d of the imaging lens assembly are supported in a lens holder 26a, which, in turn, is supported by a light blocking shroud 25a affixed to the vertical printed circuit board 25b.

Figure 8:
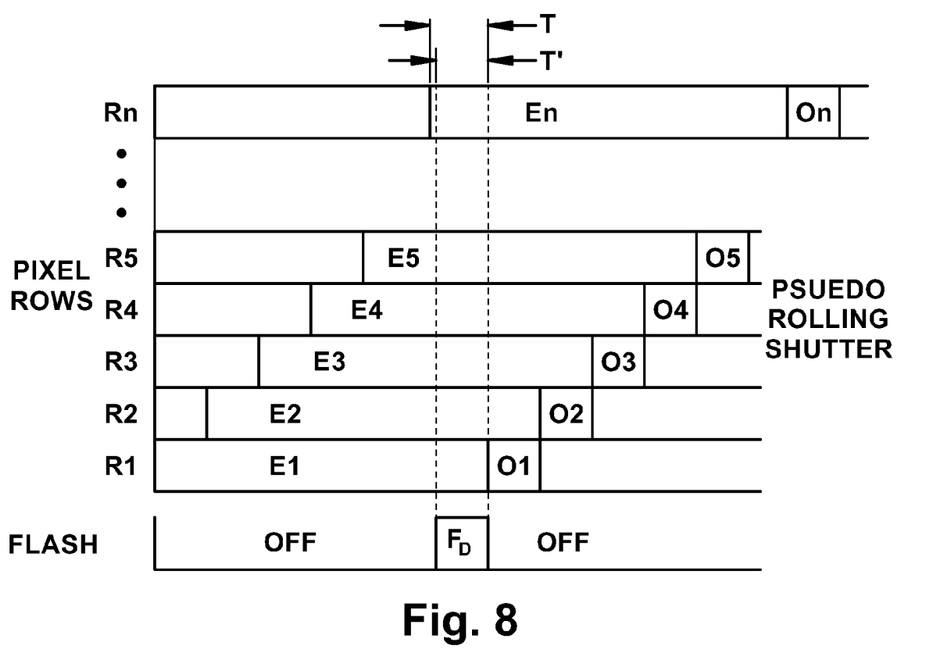
FIG. 8 is a schematic exposure and readout timing diagram of a pseudo-global shutter method of operation of a 2D sensor array of the imaging-based bar code reader of FIG. 1.

The sensor array 28 is configured in a rolling shutter electronic shutter configuration or structure and, in the present invention advantageously, is operated by the image analysis system 31 (FIG. 5) in a selected one of a rolling shutter mode or method of operation (FIG. 6) or in a pseudo-global shutter mode or method of operation (FIG. 8). The image analysis system 31 is part of the imaging system circuitry 24 and analyzes the quality of the series of image frames 42 generated by the camera assembly 22 to determine is the captured image frames 42 are of sufficient quality as to be decodable if the frames include an image 14' of the target bar code 14.

Figure 5:
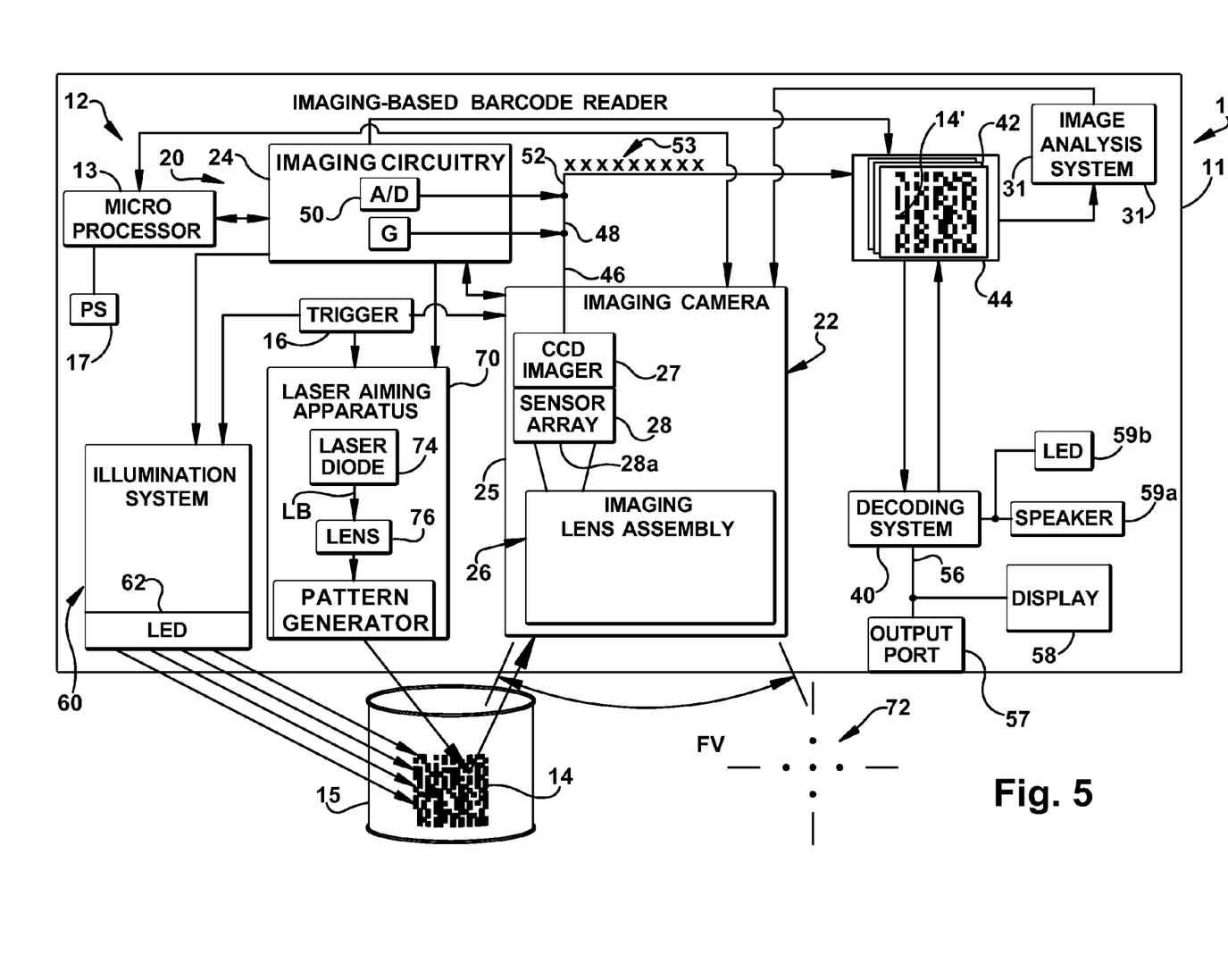
FIG. 5 is a block diagram of an imaging-based bar code reader of FIG. 1 including an image stabilization system of the present invention.

An analog electrical signal 46 (FIG. 5) is generated by reading out of accumulated electrical charges on a pixels-by-pixel basis for successive rows of pixels R1, R2, R3, ..., Rn of the sensor array 28 after an exposure period E1, E2, E3, ..., En. The read out of electrical charges on the pixels on a row by row basis is shown as O1, O2, O3, ..., On in FIGS. 6 & 8. Readout of pixel rows R1, R2, ..., Rn are representative of an image frame 42 of the field of view FV. During a reading session, the series of image frames 42 are generated and stored in buffer memory 44, as is shown in FIG. 5.

The analog image signal 46 represents a sequence of photosensor voltage values, the magnitude of each value representing an intensity of light received by a photosensor/pixel during an exposure period. The analog signal 46 is amplified by a gain factor, generating an amplified analog signal 48. The imaging circuitry 24 further includes an analog-to-digital (A/D) converter 50. The amplified analog signal 48 is digitized by the A/D converter 50 generating a digitized signal 52. The digitized signal 52 comprises a sequence of digital gray scale values 53 typically ranging from 0-255, where a 0 gray scale value would represent an absence of any reflected light received by a pixel (characterized as low pixel brightness) and a 255 gray scale value would represent a very intense level of reflected light received by a pixel during an integration period (characterized as high pixel brightness).

The digitized gray scale values 53 of the digitized signal 52 are stored in the memory 44. The digital values 53 corresponding to a read out of the pixel array 28 constitute the image frame 42, which is representative of the image projected by the imaging lens system 26 onto the sensor array 28 during an exposure period. If the field of view FV of the imaging lens system 26 includes the target bar code 14, then a digital gray scale value image 14' of the target bar code 14 would be present in the series of image frames 42.

The decoding circuitry 40 then operates on the digitized gray scale values 53 of a selected one or more of the series of image frames 42 and attempts to decode any decodable image within the image frame, e.g., the imaged target bar code 14'. If the decoding is successful, decoded data 56, representative of the data/information coded in the bar code 14 is then output via a data output port 57 and/or displayed to a user of the reader 10 via a display 58. A more detailed description of imaging and decoding is set forth in U.S. Ser. No. 11/032,767, filed Jan. 10, 2006 and entitled "Barcode Scanner Decoding." U.S. Ser. No. 11/032,767 is assigned to the assignee of the present invention and is incorporated herein in its entirety by reference.

Upon achieving a good "read" of the bar code 14, that is, the bar code 14 was successfully imaged and decoded, a speaker 59a and/or an indicator LED 59b is activated by the bar code reader circuitry 13 to indicate to the user that the target bar code 14 has successfully read, that is, the target bar code 14 has been successfully imaged and the imaged bar code 14' has been successfully decoded.

Obviously, if a single image frame 42 includes a decodable portion that is representative of or corresponds to the entire imaged target bar code 14' and thereby allows complete decoding of the target bar code in one image frame 42, the decode is complete and a signal for successful decode is generated to activate the speaker 59a and/or LED indicator 59b to let the operator know that decoding of the target bar code 14 has been completed. However with high density bar codes, such as bar code 14a, this will rarely occur because of PPM (pixel per module) limitations. Thus, a series of images 43 may need to be obtained, analyzed and partial decodes combined or stitched together utilizing a stitching method to achieve a complete decode. A suitable stitching method is disclosed in U.S. patent application Ser. No. 11/395,596, filed Mar. 31, 2006 and entitled "Imaging-Based Bar Code Reader Utilizing Stitching Method and Swipe Guide". U.S. patent application Ser. No. 11/395,569 is assigned to the assignee of the present invention and is incorporated herein in its entirety by reference.

Illumination and Aiming Systems 60, 70

The imaging system 40 further includes the illumination assembly 60 for directing a beam of illumination to illuminate the target bar code 14 and the aiming apparatus 70 for generating a visible aiming pattern 72 (FIG. 5) to aid the user in properly aiming the reader at the target bar code 14. The illumination assembly 60 and the aiming apparatus 70 operate under the control of the imaging circuitry 24. As can best be seen in FIGS. 2-4, in one exemplary embodiment, the illumination assembly 60 comprises a single LED 62 producing a wide illumination angle to completely illuminate the target bar code 14. Obviously, other illumination sources 62 may be used such as a cold cathode lamp (CFL), as would be recognized by one of skill in the art.

The illumination source 62 is supported within the scanning head 11b just behind the transparent window 18 and face forwardly, that is, toward the target bar code 14. The LED 62 is positioned away from the focusing lens 26 to increase the illumination angle (shown schematically as I in FIG. 4) produced by the illumination 62. Preferably, the active illumination provided by the illumination assembly 60 is intermittent pulse or flash illumination as opposed to continuously on illumination to save on power consumption. Also, preferably, the illumination source LED 62 is red at the higher end of the red wavelength range, e.g., approximate wavelength around 670 nanometers (nm.), since red LEDs of this wavelength have been found to provide for efficient conversion of electrons to photons by the LEDs and from photons back to electrons by the photosensor array 28.

In one exemplary embodiment, the aiming system 70 is a laser aiming apparatus. The aiming pattern 72 may be a pattern comprising a single dot of illumination, a plurality of dots and/or lines of illumination or overlapping groups of dots/lines of illumination (FIG. 5). The laser aiming apparatus 70 includes a laser diode 74, a focusing lens 76 and a pattern generator 77 for generating the desired aiming pattern 77. The laser diode 74, the lens 76 and the pattern generator are supported by a lens holder 78 which extends from the printed circuit board 25b. Typically, the laser diode emits a red colored illumination on the shorter end of the red wavelength range e.g., 625 nm., which is easier to discern to the human eye than red color having a longer wavelength. Alternately, the laser diode 74 may emit a yellow, green or yellow-green colored illumination (approximate wavelengths—green—492-577 nm., yellow—577-597 nm.) because a yellow-green color provides excellent visibility to a user of the reader 10. The aiming apparatus 70 is supported in the scanning head 11b and the aiming pattern exits the head through the transparent window 17.

Operating under the control of the imaging circuitry 24, when the user has properly aimed the reader 10 by directing the aiming pattern 72 onto the target bar code 14, the aiming apparatus 70 is turned off when an image of the target bar code 14 is acquired such that the aiming pattern 72 does not appear in the captured image frame 42. Intermittently, especially when the scanner imaging circuitry 24 is transferring the captured image frame 42 to memory 44 and/or when processing the image, the aiming apparatus 70 is turned back on. If the decoding circuitry 40 cannot decode the imaged bar code 14' and the user in the mean time has not released the trigger 12, the process of acquiring an image of the target bar code 14 set forth above is repeated.

Method of Operation of Imaging Camera 22

Figure 9:
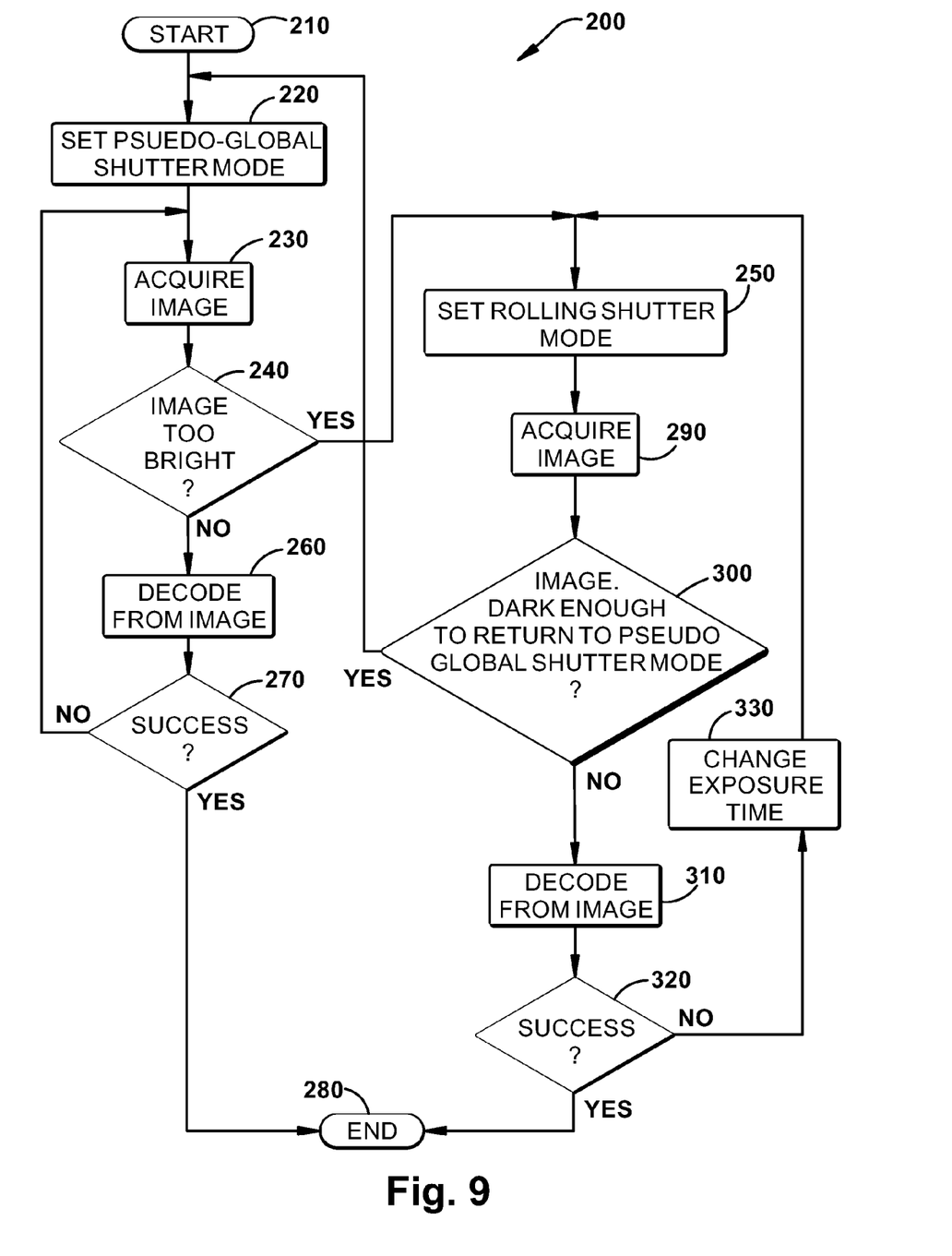
FIG. 9 is a schematic flow chart diagram of a method of operation of an imaging system of the imaging-based bar code reader of FIG. 1.

A method of operation of the imaging camera 22 is shown in schematic flow chart form in FIG. 9 at 200. In the method 22, the circuitry of the imaging camera 22 operates the camera in two electronic shutter modes: pseudo-global shutter mode (shown schematically at step 250 and in FIG. 8) and rolling shutter mode (shown schematically at step 230 and in FIG. 6). In the pseudo-global shutter mode, the camera 22 emulates the operation of an imaging camera with global shutter electronic shutter, but does so with the sensor array 28 having only a rolling shutter electronic shutter system.

Figure 6:
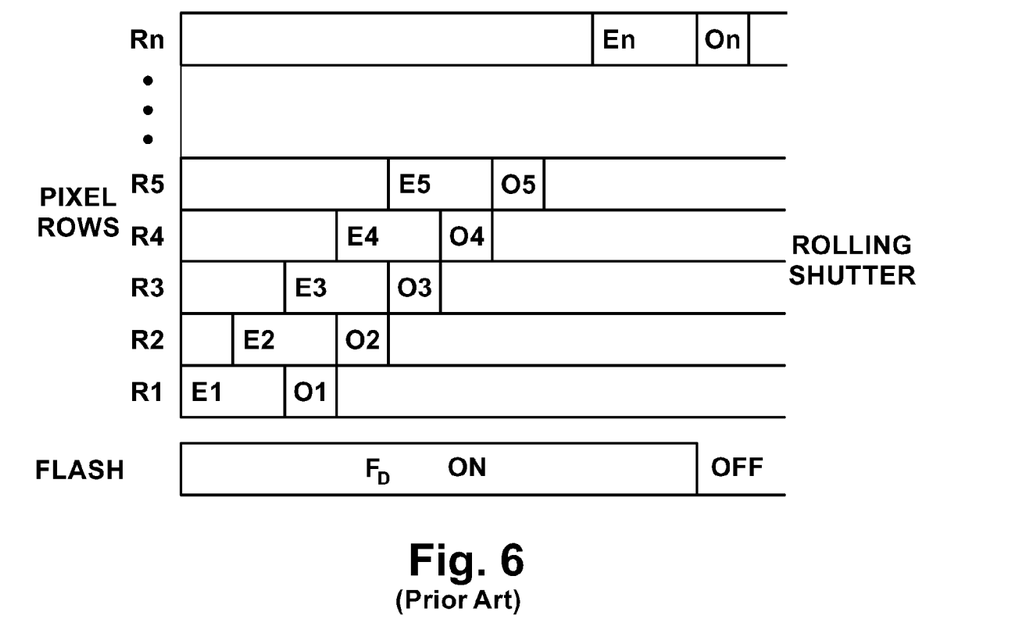
FIG. 6 is a schematic exposure and readout timing diagram of a prior art rolling shutter method of operation of 2D sensor array.

The rolling shutter mode of operation is illustrated in FIG. 6 wherein each pixel row R1, R2, . . . , Rn is exposed at sequential, staggered commencement time. As can be seen in FIG. 6, the commencement and duration of the exposure times is such that there is no time at which all the pixel rows R1, R2, . . . , Rn are exposed. Readout of a row commences after completion of the exposure time for the pixel row. The pixel rows or lines R1, R2, . . . , Rn of the rolling shutter sensor array 28 are sequentially exposed and clocked out of the array. In the rolling shutter pixel readout structure, integration or exposure time occurs just before the readout of each line of the sensor array. An image frame 42 of a field of view FV of the camera assembly 22 is built from reading out successive lines of the sensor array 28.

Figure 10:
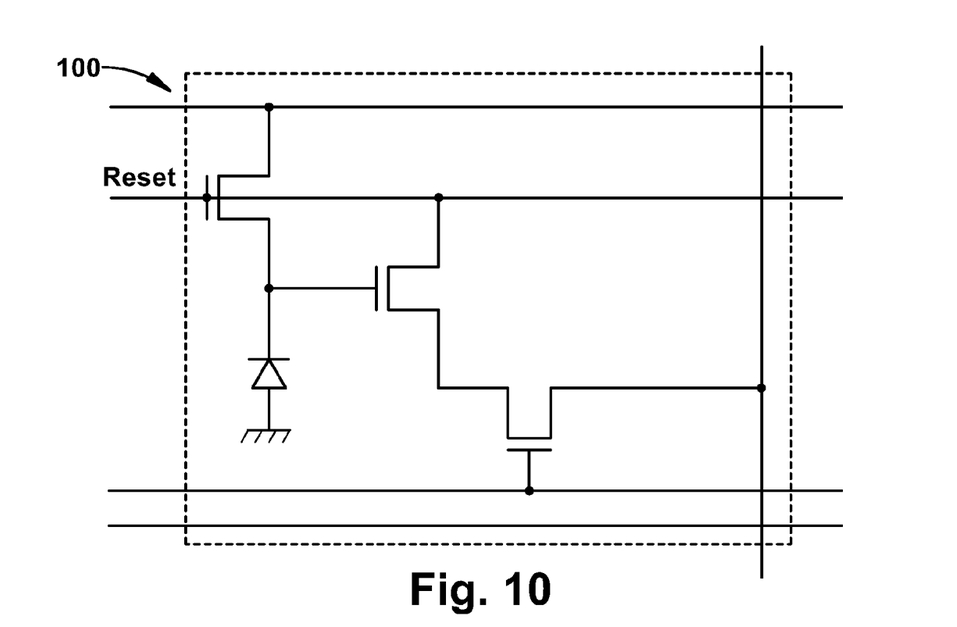
FIG. 10 is a schematic circuit diagram for the rolling shutter pixel structure for a representative pixel.

In the rolling shutter readout structure, readout of a pixel resets the pixel charge. Depending on the required speed, the chosen integration time might be shorter or longer than the frame readout time. The rolling shutter structure is easy to implement and requires only three transistors at the pixel level allowing a good signal to noise ratio. A simplified circuit diagram for the rolling shutter pixel structure for a representative pixel is shown generally at 100 in FIG. 10. The rolling shutter pixel readout structure is also tolerant if wide aperture lens are employed in the camera module 22.

A more detailed description of the rolling shutter sensor configuration is disclosed in U.S. application Ser. No. 11/700,657, filed Jan. 31, 2007 and entitled "Dual Camera Assembly for an Imaging-Based Bar Code Reader". The '657 application is assigned to the assignee of the present invention and is incorporated herein in its entirety by reference.

If active illumination from the illumination assembly 60 is used, the duration of illumination pulse or flash $F_D$ (FIG. 6) must be long enough to cover a substantial number of pixel rows. As can be seen in the schematic depiction of FIG. 6, the flash duration FD extends from the exposure of row 1 (R1) through row n (Rn) of the sensor array 28). As can be seen the duration of the flash $F_D$ is such that the flash will be on during times when the exposure time for certain pixel rows either has not commence or when the exposure time for certain pixel rows has ended. For example, for pixel row R1, the flash is on for a lengthy period after the exposure time E1 has ended and for pixel row Rn, the flash is one for a lengthy period prior to the exposure time En commencing.

As will be explained below, typically, illumination will not be needed because the rolling shutter mode of operation is utilized under conditions where ambient lighting is of high intensity and, thus, additional illumination directed toward the target bar code 14 by the illumination system 60 is generally not required.

The pseudo-global shutter mode of operation is illustrated in FIG. 8, as can be seen the exposure time for each pixel row R1, R2, . . . , Rn is set to a relatively long value and the exposure time of adjacent rows of the sensor array 28 overlap substantially. Moreover, there is a common exposure time (shown as T in FIG. 8) during which all pixel rows R1, R, R3, . . . , Rn are simultaneously exposed. As can be seen, a short pulse or flash of high intensity illumination $F_D$ is emitted by the illumination assembly 60 during at least a portion T' (or all) of the common exposure time T to capture the field of view FV of the camera 22. As can be seen in the schematic depiction of FIG. 8, the timing and duration of the pulse or flash $F_D$ is such that the flash occurs when all or substantially all of the pixels rows are being simultaneously exposed.

Figure 7:
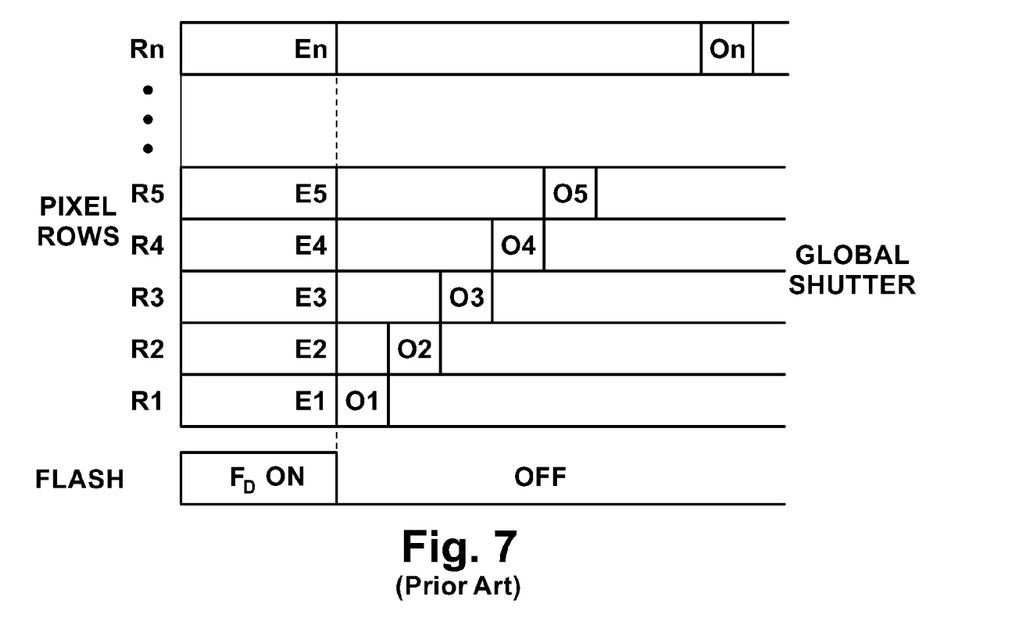
FIG. 7 is a schematic exposure and readout timing diagram of a prior art global shutter method of operation of a 2D sensor array.

As can be seen comparing FIG. 8 with the global shutter illustration of FIG. 7, the pseudo-global shutter is somewhat akin to the global shutter mode in that there is a common exposure time for all of pixel rows. However, as can be seen, the pseudo-global shutter mode of FIG. 8 has a sequential, staggered exposure commencement time, not a congruent, simultaneous exposure time as is shown in the traditional global shutter mode of operation illustrated in FIG. 7. Additionally, in the pseudo-global shutter mode of operation, the pulse $F_D$ is emitted when all or substantially all of the pixels rows are being simultaneously exposed, as shown schematically in FIG. 8 wherein it can be seen that all rows R1, R2, . . . , Rn are exposed during the duration of pulse $F_D$.

In order to make the pseudo-global shutter mode of operation work, ambient light must be blocked from reaching the sensor array 28 hence the narrow-band optical filter 26d is provided in the imaging lens assembly 26. The filter 26d blocks most light wavelengths but the band pass range of the filter 26d is such that most all the wavelengths of light emitted by the illumination assembly 60 pass through the filter 26d and reach a light receiving surface 28a of the sensor array 28. Stated another way, the band pass range of the filter 26d overlaps and is slightly larger than a range of illumination wavelengths emitted by the illumination assembly 60.

Utilizing the filter 26d allows the sensor array 26, which is configured as a rolling shutter only sensor array to emulate a global shutter sensor array. In implementing the pseudo-global shutter mode of operation, the pass band of the filter 26d cannot be too narrow because light passing though the filter at different angles within the field of view FV behaves as light having differing wavelengths. That is, the filter 26d cannot be an exact fit for the narrow emission bandwidth of the illumination system 60. The pass band of the filter 26d is determined at the time the reader 10 is designed based on the bandwith of the illumination source 62 of the illumination system 60 and the imaging system field of view FV.

Because of the necessary broadening of the pass band of the optical filter 26d, the imaging lens assembly 26 is only able to block a portion of the ambient light received by the lens assembly 26. Ambient light that reaches the sensor array 28 when the electronic shutter is open is leaked light that for imaging quality purposes behaves like a background noise. While the blockage provided by the filter 26d may be sufficient in office lighting conditions where ambient illumination is not overwhelming, because of the longer exposure times inherent in the pseudo-global shutter method of operation, the filter is not a total solution. In a brightly lit environment, e.g., where direct sunlight is shining on the target bar object 15, the leaked illumination may inundate the active illumination provided by the illumination assembly 60 causing poor imaging performance in the pseudo-global shutter mode of operation.

As can be seen in FIG. 9, the present invention provides a mode of imaging operation that provides for a combination of a pseudo-global shutter mode of operation in less intense ambient lighting conditions wherein imaging performance with the pseudo-global mode of operation is acceptable and a rolling shutter mode of operation if ambient lighting conditions are sufficiently intense that the level of ambient light exposure experienced by the sensor 28 would result in captured image frames 42 in which the target bar code image 14' would be impossible or very difficult to successfully decode if the pseudo-global shutter mode of operation were used.

Referring to FIG. 9, at step 210, an imaging session is commenced and, at step 220, the imaging camera 22 and, specifically, the sensor array 28 is initially operated in the pseudo-global shutter mode of operation and at least during a portion of the common exposure period T of the pixel rows R1, R2, . . . , Rn of the sensor array 28, a pulse of illumination is generated by illumination system 60. At step 230, the camera 22 generates an image frame 42 which is analyzed by the image analysis system 31 for image brightness of the captured target bar code 14'. If at step 240, the bar code image 14' is determined to be too bright, that is, the level of ambient light exposure received by the sensor 28 is making the captured bar code image 14' difficult or impossible to process and decode, then the shutter mode of operation is switched to the rolling shutter mode at step 250.

If, on the other hand, at step 240, the target bar code image 14' in the image frame 42 generated by the camera 22 is determined to be of acceptable contrast and brightness, that is, the level of ambient light exposure received by the sensor 28 is within acceptable limits, then at step 260, the decoding system 40 attempts to decode the image 14'. Acceptable limits of light exposure received by the sensor 28 typically will be in the range of no more than 120-150% of the light exposure received by the sensor 28 if the reader 10 were operated in totally dark environment, i.e., the only light reaching the sensor 28 would be illumination generated by the illumination assembly 60 and reflected back to the imaging lens assembly 26 by objects, such as the target object 15, within the field of view FV of the imaging system 20.

At step 270, if decoding of the bar code image 14' from the captured image frame 42 is successful, the imaging session terminates at step 280. If at step 270, the decoding of the bar code image 14' is unsuccessful, the process returns to step 230 wherein a new image frame 42 is captured and analyzed as described above.

As noted above, if at step 240, the target bar code image 14' in the image frame 42 is determined to be too bright, the imaging system shutter mode of operation is switched to the rolling shutter mode at step 250. At step 290, the camera 22 generates an image frame which is analyzed by the image analysis system 31 for image brightness. If at step 300, the imaged bar code 14' is determined to be dark enough to return the sensor array 28 to the pseudo-global shutter mode, then the process reverts back to step 220 wherein the imaging system resets the sensor array 28 operation to the pseudo-global shutter mode of operation.

If, on the other hand, at step 300 the bar code image 14' is determined not to be dark enough to return the sensor array 28 to the pseudo-global shutter mode, then, at step 310, the decoding system 40 attempts to decode the target bar code image 14' within the captured image frame 42. At step 320, if decoding of the imaged bar code 14' from the captured image frame 42 is successful, the imaging session terminates at step 280. If at step 320, the decoding of the target bar code image 14' is unsuccessful, at step 330, the imaging system determines if changes to gain and/or exposure time are required to attempt to improve image quality and the process returns to step 290 wherein a new image frame 42 is captured and analyzed as described above. Obviously, if none of the captured image frames 42 have the imaged target bar code 14', that is, the target bar code 14 was not within the field of view, then the process simply repeats until such time as image frames 42 having the imaged target bar code 14' are captured or the imaging session is terminated after a predetermined timeout period.

While the present invention has been described with a degree of particularity, it is the intent that the invention includes all modifications and alterations from the disclosed design falling with the spirit or scope of the appended claims.

We claim:

1. An imaging system for use in an imaging-based bar code reader to image a target bar code, the imaging system comprising:
   an illumination system, when actuated, emitting a pulse of illumination;
   a 2D sensor array configured in a rolling shutter mode of electronic shutter operation and generating a series of image frames of a field of view of the imaging system, the sensor array selectively operable in a rolling shutter mode of operation wherein commencement of image frame exposure times are staggered for adjacent rows of the sensor array and operable in a pseudo-global shutter mode of operation wherein image frame exposure times commenced sequentially for adjacent rows of the sensor array are overlapping such that there is a common exposure time wherein substantially all of the rows of the sensor array are simultaneously exposed and further wherein, for at least a portion of the common exposure time, the illumination system is actuated to emit an illumination pulse;
   an imaging lens assembly to focus light from the field of view onto the sensor array; and
   an image analysis system for analyzing the series of image frames generated by the sensor array for image brightness and, based on image brightness, operating the sensor array in a selected one of the rolling shutter mode of operation and the pseudo-global shutter mode of operation.

2. The imaging system of claim 1 wherein the sensor array is normally operated in the pseudo-global shutter mode of operation and is switched to the rolling shutter mode of operation if image brightness exceeds a level of brightness such that an image of the target bar code in the series of image frames would be undecodable.

3. The imaging system of claim 1 wherein the imaging lens assembly includes a narrow band optical filter to block light outside of a predetermined range from passing through the lens assembly.

4. The imaging system of claim 3 wherein the imaging system further includes the illumination system emitting illumination of a predetermined wavelength, the predetermined wavelength being within the predetermined range of the narrow band optical filter.

5. The imaging system of claim 4 wherein the image frame exposure times for sensor array rows for the pseudo-global shutter mode of operation are greater in duration than image frame exposure times for corresponding sensor array rows for rolling shutter mode of operation.

6. The imaging system of claim 1 wherein the 2D sensor array and the imaging lens assembly are part of a camera assembly.

7. An imaging-based bar code reader for imaging a target bar code, the reader comprising:
an imaging system including an imaging camera assembly comprising:
an illumination system, when actuated, emitting a pulse of illumination;
2D sensor array configured in a rolling shutter mode of electronic shutter operation and generating a series of image frames of a field of view of the imaging system, the sensor array selectively operable in a rolling shutter mode of operation wherein commencement of image frame exposure times are staggered for adjacent rows of the sensor array and operable in a pseudo-global shutter mode of operation wherein image frame exposure times commenced sequentially for adjacent rows of the sensor array are overlapping such that there is a common exposure time wherein substantially all of the rows of the sensor array are simultaneously exposed and further wherein, for at least a portion of the common exposure time, the illumination system is actuated to emit an illumination pulse;
an imaging lens assembly to focus light from the field of view onto the sensor array; and
an image analysis system for analyzing the series of image frames generated by the sensor array for image brightness and, based on image brightness, operating the sensor array in a selected one of the rolling shutter mode of operation and the pseudo-global shutter mode of operation.

8. The imaging-based bar code reader of claim 7 wherein the sensor array is normally operated in the pseudo-global shutter mode of operation and is switched to the rolling shutter mode of operation if image brightness exceeds a level of brightness such that an image of the target bar code in the series of image frames would be undecodable.

9. The imaging-based bar code reader of claim 7 wherein the imaging lens assembly includes a narrow band optical filter to block light outside of a predetermined range from passing through the lens assembly.

10. The imaging-based bar code reader of claim 9 wherein the imaging system further includes an illumination system emitting illumination of a predetermined wavelength, the predetermined wavelength being within the predetermined range of the narrow band optical filter.

11. The imaging-based bar code reader of claim 10 wherein the image frame exposure times for sensor array rows for the pseudo-global shutter mode of operation being greater in duration than image frame exposure times for corresponding sensor array rows for rolling shutter mode of operation.

12. The imaging-based bar code reader of claim 7 wherein the 2D sensor array and the imaging lens assembly are part of a modular camera assembly.

13. A method of imaging a target object, the steps of the method comprising:
providing an imaging system including: an illumination system, when actuated, emitting an illumination pulse; a 2D sensor array configured in a rolling shutter mode of electronic shutter operation and generating a series of image frames of a field of view of the imaging system, the sensor array selectively operable in a rolling shutter mode of operation wherein commencement of image frame exposure times are staggered for adjacent rows of the sensor array and operable in a pseudo-global shutter mode of operation wherein image frame exposure times commenced sequentially for adjacent rows of the sensor array are overlapping such that there is a common exposure time wherein substantially all of the rows of the sensor array are simultaneously exposed and further wherein, for at least a portion of the common exposure time, the illumination system is actuated to emit an illumination pulse; an imaging lens assembly to focus light from the field of view onto the sensor array; and an image analysis system for analyzing the series of image frames generated by the sensor array for image brightness and, based on image brightness, operating the sensor array in a selected one of the rolling shutter mode of operation and the pseudo-global shutter mode of operation; and
energizing the imaging system to image the target object, the 2D sensor array being selectively operated in either the rolling shutter mode of operation or the pseudo-global shutter mode of operation depending on ambient lighting conditions.

14. The method of claim 13 wherein the sensor array is normally operated in the pseudo-global shutter mode of operation and is switched to the rolling shutter mode of operation if image brightness exceeds a level of brightness such that an image of the target bar code in the series of image frames would be undecodable.

15. The method of claim 13 wherein the imaging lens assembly includes a narrow band optical filter to block light outside of a predetermined range from passing through the lens assembly and the imaging system further includes an illumination system emitting illumination of a predetermined wavelength, the predetermined wavelength being within the predetermined range of the narrow band optical filter and further wherein if, when operating the sensor array in pseudo-global shutter mode of operation, the image analysis system determines that image brightness is below a predetermined level, the illumination system being actuated to generate a flash of illumination, the flash of illumination having a duration that is less than image frame exposure times for rows of the sensor array and occurring at a time when a plurality of rows of the sensor array are being exposed.

16. An imaging system for use in an imaging-based bar code reader to image a target bar code, the imaging system comprising:
an illumination system means, when actuated, emitting a pulse of illumination;
a 2D sensor array means configured in a rolling shutter mode of electronic shutter operation and generating a series of image frames of a field of view of the imaging system, the sensor array means selectively operable in a rolling shutter mode of operation wherein commencement of image frame exposure times are staggered for adjacent rows of the sensor array means and operable in a pseudo-global shutter mode of operation wherein image frame exposure times commenced sequentially for adjacent rows of the sensor array means are overlapping such that there is a common exposure time wherein substantially all of the rows of the sensor array means are simultaneously exposed and further wherein, for at least a portion of the common exposure time, the illumination system means is actuated to emit an illumination pulse;
an imaging lens assembly means to focus light from the field of view onto the sensor array; and
an image analysis system means for analyzing the series of image frames generated by the sensor array for image brightness and, based on image brightness, operating the sensor array means in a selected one of the rolling shutter mode of operation and the pseudo-global shutter mode of operation.

17. The imaging system of claim 16 wherein the sensor array means is normally operated in the pseudo-global shutter mode of operation and is switched to the rolling shutter mode of operation if image brightness exceeds a level of brightness such that an image of the target bar code in the series of image frames would be undecodable.

18. The imaging system of claim 16 wherein the imaging lens assembly means includes a narrow band optical filter to block light outside of a predetermined range from passing through the lens assembly means.

19. Computer-readable media having computer-executable instructions for performing a method of operating an imaging-based bar code reader for imaging a target bar code on a target object, the steps of the method comprising:

providing an imaging system including: an illumination system, when actuated, emitting a pulse of illumination; a 2D sensor array configured in a rolling shutter mode of electronic shutter operation and generating a series of image frames of a field of view of the imaging system, the sensor array selectively operable in a rolling shutter mode of operation wherein commencement of image frame exposure times are staggered for adjacent rows of the sensor array and operable in a pseudo-global shutter mode of operation wherein image frame exposure times commenced sequentially for adjacent rows of the sensor array are overlapping such that there is a common exposure time wherein substantially all of the rows of the sensor array are simultaneously exposed and further wherein, for at least a portion of the common exposure time, the illumination system is actuated to emit an illumination pulse; an imaging lens assembly to focus light from the field of view onto the sensor array; and an image analysis system for analyzing the series of image frames generated by the sensor array for image brightness and, based on image brightness, operating the sensor array in a selected one of the rolling shutter mode of operation and the pseudo-global shutter mode of operation; and energizing the imaging system to image the target object, the 2D sensor array being selectively operated in either the rolling shutter mode of operation or the pseudo-global shutter mode of operation depending on ambient lighting conditions.

20. An imaging system for use in an imaging-based bar code reader to image a target bar code, the imaging system comprising:

an illumination system, when actuated, emitting a pulse of illumination;

a 2D sensor array configured in a rolling shutter mode of electronic shutter operation and generating a series of image frames of a field of view of the imaging system, the sensor array selectively operable in a rolling shutter mode of operation wherein commencement of image frame exposure times are staggered for adjacent rows of the sensor array and operable in a pseudo-global shutter mode of operation wherein image frame exposure times commenced sequentially for adjacent rows of the sensor array are overlapping such that there is a common exposure time wherein substantially all of the rows of the sensor array are simultaneously exposed and further wherein, for at least a portion of the common exposure time, the illumination system is actuated to emit an illumination pulse; and an image analysis system for analyzing the series of image frames generated by the sensor array for image brightness and, based on image brightness, operating the sensor array in a selected one of the rolling shutter mode of operation and the pseudo-global shutter mode of operation.

* * * * *

UNITED STATES PATENT AND TRADEMARK OFFICE
CERTIFICATE OF CORRECTION

PATENT NO.       : 7,866,557 B2                                                   Page 1 of 1
APPLICATION NO.  : 11/862583
DATED            : January 11, 2011
INVENTOR(S)      : He et al.

It is certified that error appears in the above-identified patent and that said Letters Patent is hereby corrected as shown below:

On the Face Page, in Field (57), under "ABSTRACT", in Column 2, Line 3, delete "The" and insert -- the --, therefor.

In Column 5, Line 36, delete "R2, R2," and insert -- R2, R3, --, therefor.

In Column 10, Line 9, delete "R1, R," and insert -- R1, R2, --, therefor.

In Column 10, Line 52, delete "bandwith" and insert -- bandwidth --, therefor.

Signed and Sealed this
Thirty-first Day of July, 2012

David J. Kappos
*Director of the United States Patent and Trademark Office*